US008760705B2

(12) United States Patent
Fukasawa

(10) Patent No.: US 8,760,705 B2
(45) Date of Patent: Jun. 24, 2014

(54) IMAGE PROCESSING APPARATUS

(75) Inventor: Ryuji Fukasawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1565 days.

(21) Appl. No.: 12/132,781

(22) Filed: Jun. 4, 2008

(65) Prior Publication Data

US 2008/0297849 A1 Dec. 4, 2008

(30) Foreign Application Priority Data

Jun. 4, 2007 (JP) ................................ 2007-148268

(51) Int. Cl.
| H04N 1/00 | (2006.01) |
| H04N 1/04 | (2006.01) |
| H04N 1/21 | (2006.01) |
| G06F 3/12 | (2006.01) |
| G06F 13/00 | (2006.01) |
| G06F 15/00 | (2006.01) |
| G06K 15/02 | (2006.01) |

(52) U.S. Cl.
USPC ........ 358/1.16; 358/1.15; 358/1.17; 358/501; 358/505; 358/401; 358/403; 358/444; 358/448; 358/474

(58) Field of Classification Search
None
See application file for complete search history.

(56) References Cited

U.S. PATENT DOCUMENTS

| 5,247,665 | A  * | 9/1993  | Matsuda et al. ..................... 1/1 |
| 6,378,033 | B1 * | 4/2002  | Nishikawa .................... 711/103 |
| 6,574,231 | B1 * | 6/2003  | Leung ........................... 370/412 |
| 6,947,165 | B1 * | 9/2005  | Kataoka ....................... 358/1.16 |
| 7,193,916 | B2 * | 3/2007  | Yokota et al. ................. 365/218 |
| 7,603,023 | B2 * | 10/2009 | Kudo ............................ 386/326 |
| 7,619,953 | B2 * | 11/2009 | Shiina ....................... 369/47.15 |
| 7,953,946 | B2 * | 5/2011  | Anand et al. .................. 711/162 |
| 2001/0035967 | A1 * | 11/2001 | Tomomatsu ................... 358/1.9 |
| 2002/0135816 | A1 * | 9/2002 | Ohwa .......................... 358/474 |
| 2002/0144022 | A1 * | 10/2002 | Tsukihashi et al. ............... 710/1 |
| 2003/0048281 | A1 * | 3/2003 | Murai et al. .................. 345/620 |
| 2003/0234952 | A1 * | 12/2003 | Abe ............................ 358/1.14 |
| 2004/0240847 | A1 * | 12/2004 | Kojima et al. .................. 386/95 |
| 2005/0030382 | A1 * | 2/2005 | Okamoto ................... 348/207.1 |
| 2007/0263247 | A1 * | 11/2007 | Nagai ......................... 358/1.15 |
| 2008/0018953 | A1 * | 1/2008 | Narimatsu et al. ............ 358/471 |
| 2008/0151299 | A1 * | 6/2008 | Takahata ..................... 358/1.15 |
| 2008/0239384 | A1 * | 10/2008 | Kadota ........................ 358/1.15 |

FOREIGN PATENT DOCUMENTS

| JP | H09-200461   |   | 7/1997 |            |
| JP | 2006-252154  | * | 9/2006 | ............... G06T 1/20 |
| JP | 2007-004463  | * | 1/2007 | ............. G06F 12/00 |
| JP | 2007-019742  | * | 1/2007 | ............. H04N 5/907 |

* cited by examiner

*Primary Examiner* — King Poon
*Assistant Examiner* — Beniyam Menberu
(74) *Attorney, Agent, or Firm* — Panitch Schwarze Belisario & Nadel LLP

(57) ABSTRACT

An image processing apparatus storing an image data to an external memory medium connected to the image processing apparatus is provided. Where there is not enough usable capacity in the external memory medium, the image processing apparatus generates medium identification information and stores the generated medium identification information to the external memory medium. After a user detaches the external memory medium from the image processing apparatus and uses his or her computer to delete or move unnecessary files in the external memory medium to increase the usable capacity therein, the user attaches the external memory medium to the image processing apparatus again. At this moment, the external memory medium is authenticated by the medium identification information stored therein. Thus, this authentication performed using the medium identification information prevents a third person from obtaining the image data of the user while the user is away from the image processing apparatus.

12 Claims, 7 Drawing Sheets

EXTERNAL VIEW OF IMAGE PROCESSING APPARATUS
IN A CASE WHERE THE IMAGE PROCESSING

SECTIONAL VIEW OF IMAGE PROCESSING APPARATUS IN A CASE WHERE THE IMAGE PROCESSING APPARATUS IS A SCANNER

1ST FLOWCHART SHOWING OPERATION
OF THE IMAGE PROCESSING APPARATUS ACCORDING TO
THE EMBODIMENT OF THE PRESENT INVENTION

2ND FLOWCHART SHOWING OPERATION
OF THE IMAGE PROCESSING APPARATUS ACCORDING TO
THE EMBODIMENT OF THE PRESENT INVENTION

3RD FLOWCHART SHOWING OPERATION OF THE IMAGE PROCESSING APPARATUS ACCORDING TO THE EMBODIMENT OF THE PRESENT INVENTION

IMAGE PROCESSING APPARATUS

BACKGROUND OF THE INVENTION

1. Field of the Invention

The present invention relates to an image processing apparatus having an interface unit for allowing an external memory medium to detachably connect to the image processing apparatus.

2. Description of Related Art

A prior art image processing apparatus having an interface for allowing an external memory medium to detachably connect to the image processing apparatus is disclosed, for example, in Japanese Patent Application Publication No. H9-200461. The publication No. H9-200461 discloses a scanner that reads, in response to operation performed by a user on a control panel on the body of the scanner, a document placed on a platen glass on the body of the scanner to generate image data and stores the obtained image data to an external memory medium connected to an interface unit of the scanner via a buffer memory. In a case where the prior art scanner is introduced to, for example, an office and is connected one-by-one to an information processing apparatus such as a PC (Personal Computer) of a user who often performs operations using the scanner, the scanner can also store to a memory unit in the information processing apparatus the image data obtained based on the operation performed by the user.

In a case where the prior art scanner is shared by multiple users, each user walks over to the scanner to attach his or her external memory medium to the interface unit of the scanner so that the scanner stores to the external memory medium via the buffer memory the image data obtained based on the operation performed by the user on the control panel. Then, the scanner deletes the image data in the buffer memory upon storing the image data to the external memory medium. When the image data has been stored in the external memory medium, the user removes the document from the platen glass of the scanner, removes the external memory medium from the interface unit, and walks away from the scanner.

Where the size of the generated image data is more than the usable capacity in the external memory medium, the prior art scanner cannot store the image data to the external memory medium, and for example, the scanner displays on the control panel a notification that the external memory medium does not have enough usable capacity. Accordingly, the user who operates the scanner may leave the scanner without cancelling the operation of the scanner so that for example, the user moves data in the external memory medium to a memory unit in the information processing apparatus owned by the user to increase the usable capacity in the external memory medium. In this case, the buffer memory of the scanner continues to hold the image data.

If a third person inserts his or her external memory medium into the interface unit of the scanner in such situation, the scanner stores the image data to the external memory medium of the third person, and thus, the prior art scanner has a risk that the image data in the buffer memory may be stolen by the malicious third person.

SUMMARY OF THE INVENTION

This invention is made to solve the above problems, and it is the object of the present invention to provide an image processing apparatus having an interface unit for allowing an external memory medium to detachably connect to the image processing apparatus, wherein when the external memory medium is inserted into the interface unit while the buffer memory stores the image data, the image processing apparatus stores the image data to the external memory medium only where the external memory medium is judged to be able to store the image data.

The present invention has a following structure to solve the above problems. The image processing apparatus has an interface unit allowing an external memory medium to detachably connect to the image processing apparatus, an image size detection unit detecting a size of image data to be stored to the external memory medium, a usable capacity detection unit detecting a usable capacity in the external memory medium connected to the interface unit, and a storing control unit storing the image data to the external memory medium when the size of the image data is less than or equal to the usable capacity, and the image processing apparatus includes an acquiring unit acquiring the medium identification information from the external memory medium when the external memory medium is connected to the interface unit, a memory unit, where the size of the image data is more than the usable capacity in the external memory medium, associating the image data with the acquired medium identification information to form registration image data and memorizing the registration image data, a notification unit notifying a shortage of the usable capacity in the external memory medium, and a judgment unit searching the memory unit based on the medium identification information acquired from the acquiring unit and making a judgment as to whether the corresponding registration image data is held in the memory unit, wherein when the corresponding registration image data is held in the memory unit, the storing control unit stores the corresponding registration image data to the external memory medium where the size of the registration image data is less than or equal to the usable capacity in the external memory medium.

When the external memory medium is inserted into the interface unit while the buffer memory stores the image data, the image processing apparatus of the present invention having the interface unit for allowing the external memory medium to detachably connect to the image processing apparatus stores the image data to the external memory medium only where the external memory medium is judged to be able to store the image data.

DETAILED DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein.

Figure 5:
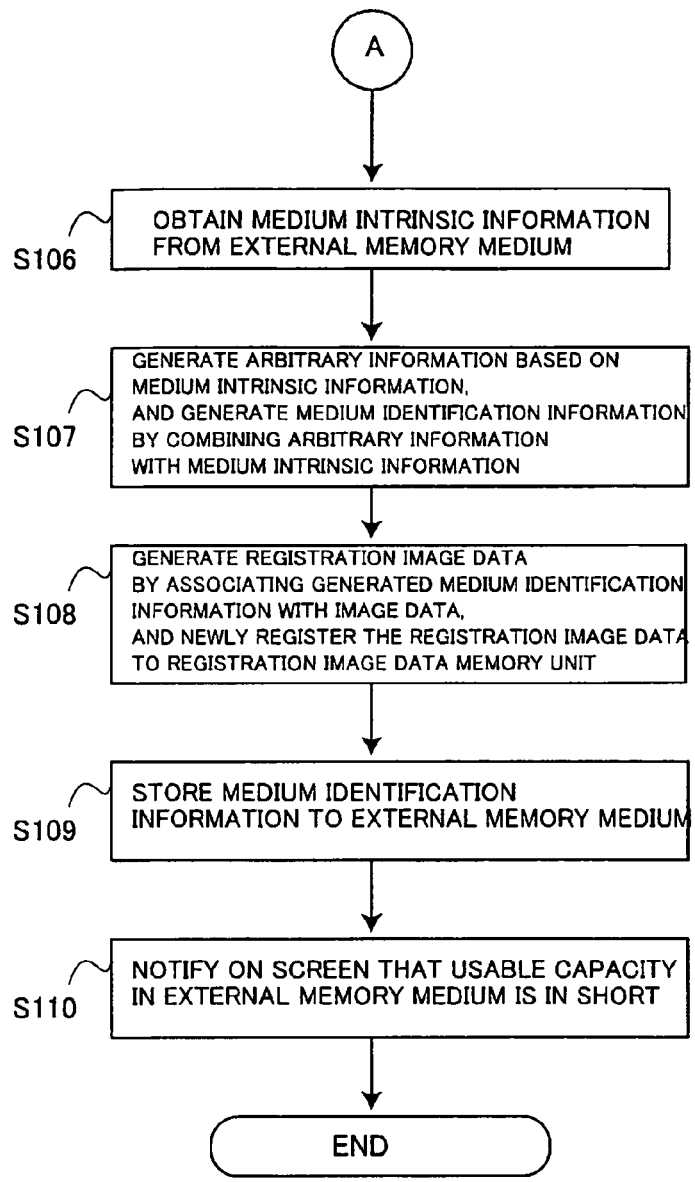
Figure 6:
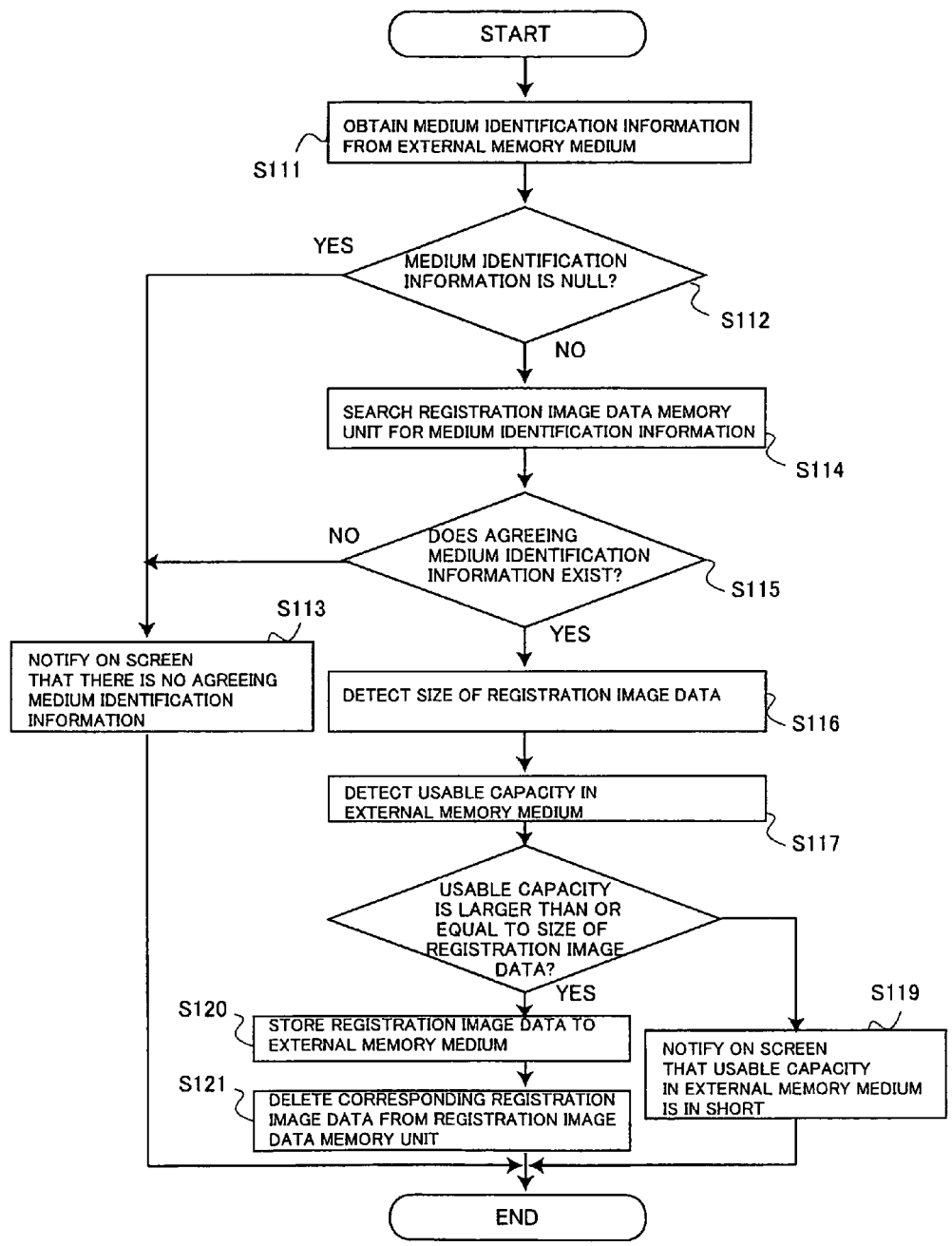
Figure 7:
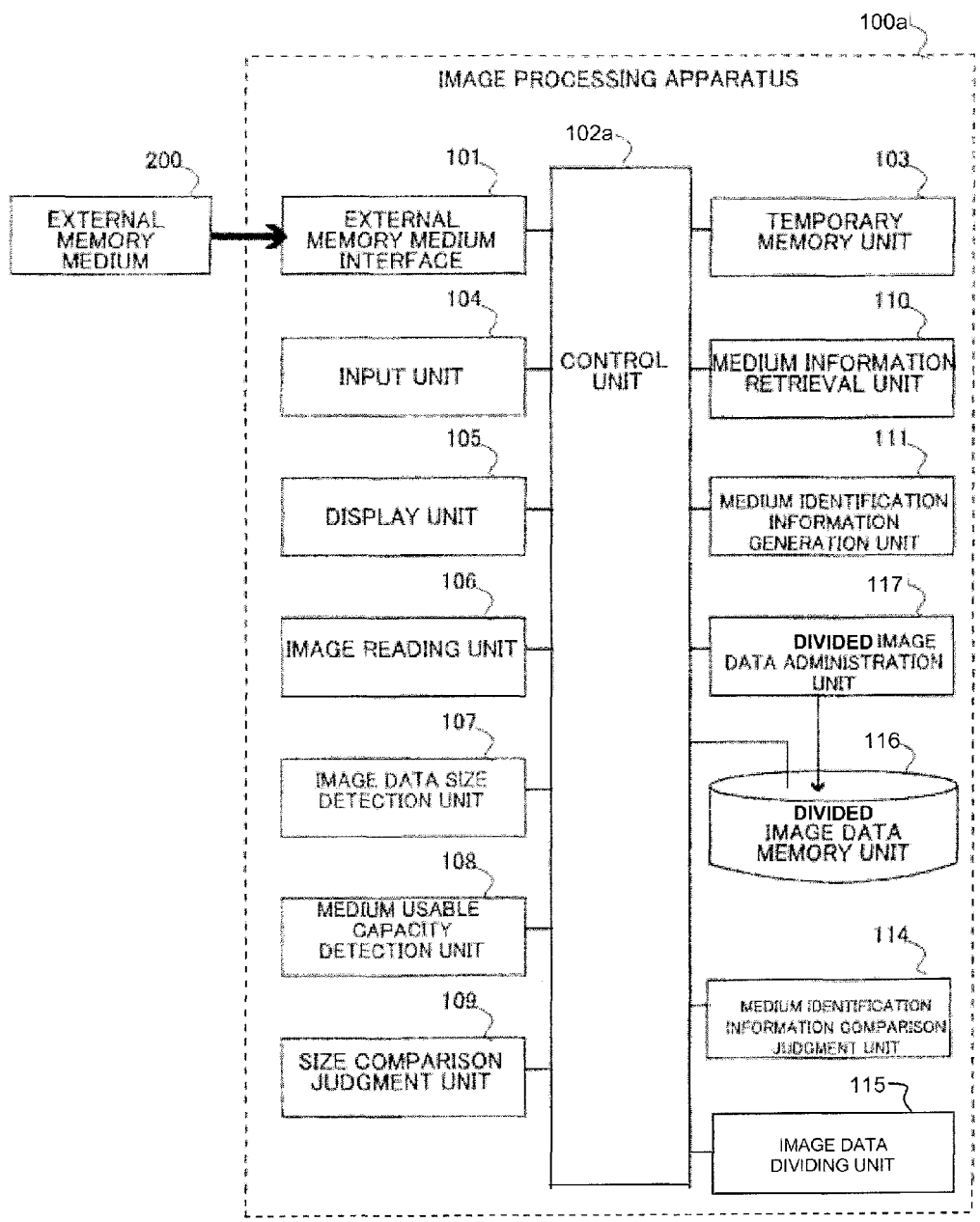

FIG. 5 the second flowchart showing operation of the image processing apparatus according to the embodiment of the present invention;

FIG. 6 the third flowchart showing operation of the image processing apparatus according to the embodiment of the present invention; and FIG. 7 is a block diagram showing the structure of the image processing apparatus according to another embodiment of the present invention.

PREFERED EMBODIMENTS

The embodiment of the present invention is hereinafter described in detail with reference to the figures.

An image processing apparatus 100 according to the embodiment of the present invention is, for example, a scanner generating image data upon optically reading, in response to operation performed by a user, a document on platen glass described later. The structure and function of each unit of the image processing apparatus 100 is hereinafter described with reference to FIGS. 2 and 3 in a case where the image processing apparatus 100 is the scanner.

Figure 2:
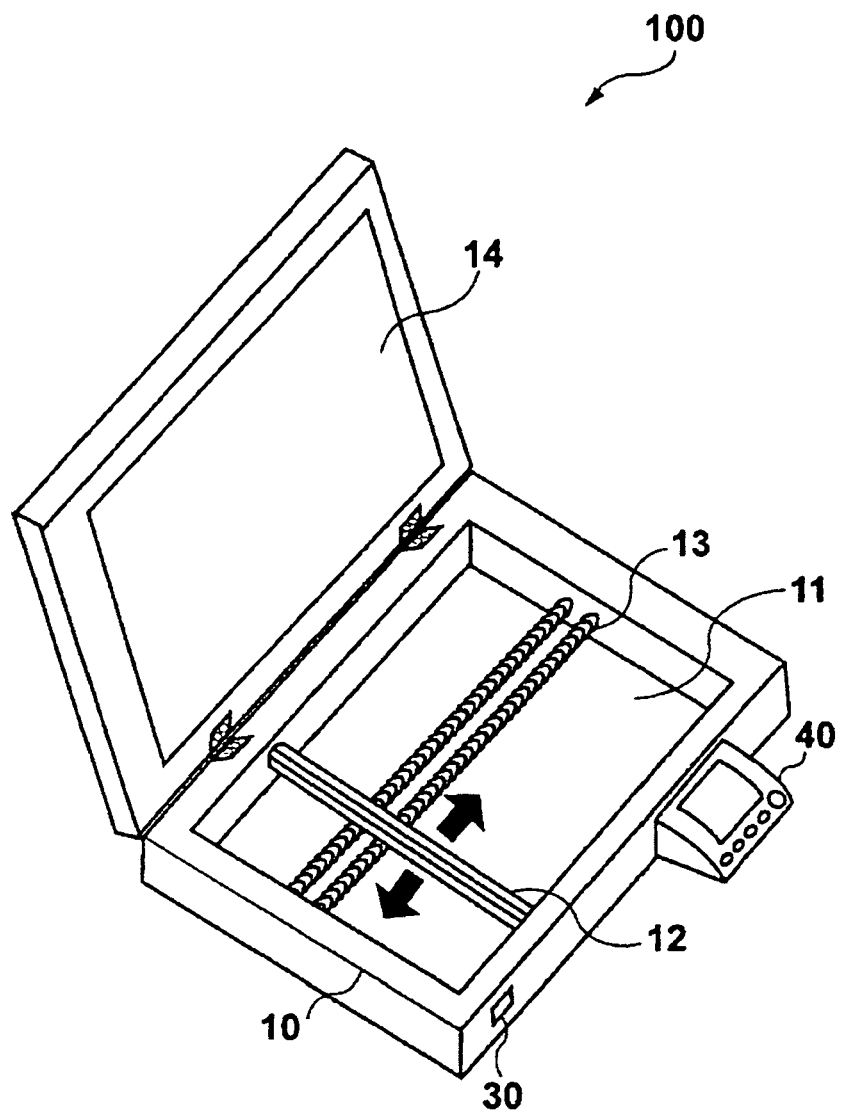
FIG. 2 is an external view of the image processing apparatus in a case where the image processing apparatus is a scanner.

As shown in FIG. 2, the image processing apparatus 100, serving as the scanner, has a reading unit 10 optically reading image data out of a document placed on platen glass 11 described later to generate image data, a connector 30 serving as an interface for connecting to an external memory medium 200, described later, arranged to be detachable, and an operation panel 40 having an input function allowing the user to input instructions and a display function displaying on a screen various notification information, described later, supplied from the image processing apparatus 100.

Figure 3:
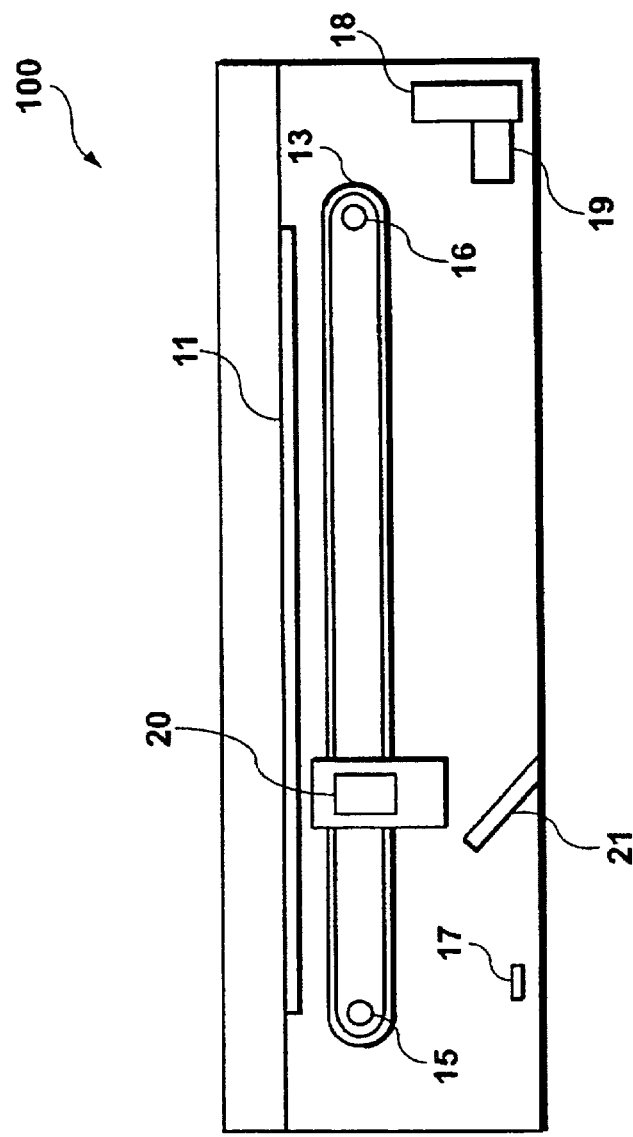
FIG. 3 is a sectional view of the image processing apparatus in a case where the image processing apparatus is a scanner FIG. 4 the first flowchart showing operation of the image processing apparatus according to the embodiment of the present invention.

As shown in FIG. 3, the reading unit 10 has the platen glass 11 accommodating the document, a reading carriage 12 photographing the document placed on the platen glass 11 from below, a conveyance belt 13 moving the reading carriage 12 in a subscanning direction, and a correction panel 14 presses the document on the platen glass 11 from above to secure the document.

As shown in FIG. 3, the reading unit 10 has a stepping motor 15 secured to a shaft of the stepping motor 15 arranged inside the conveyance belt 13 to convey the conveyance belt 13, a belt roller 16 arranged, together with the stepping motor 15, inside the conveyance belt 13 to rotate the conveyance belt 13, and a position sensor 17 detecting the position of the reading carriage 12 on the conveyance belt 13.

The reading unit 10 has a reading system based on reduction optical method, and uses a CCD (Charged Coupled Devices) image sensor 18, a lens 19, a light source 20 arranged on the reading carriage 12, and a mirror 21. The document is illuminated with light from the light source 20, the reflected light is reflected with the mirror 21, and the CCD image sensor 18 receives the light passing through the lens 19. The received light is converted through analog-to-digital conversion and RGB (Red-Green-Blue) conversion to generate image data. Image data generation through the reduction optical method is not described here because such method is well-known.

Figure 1:
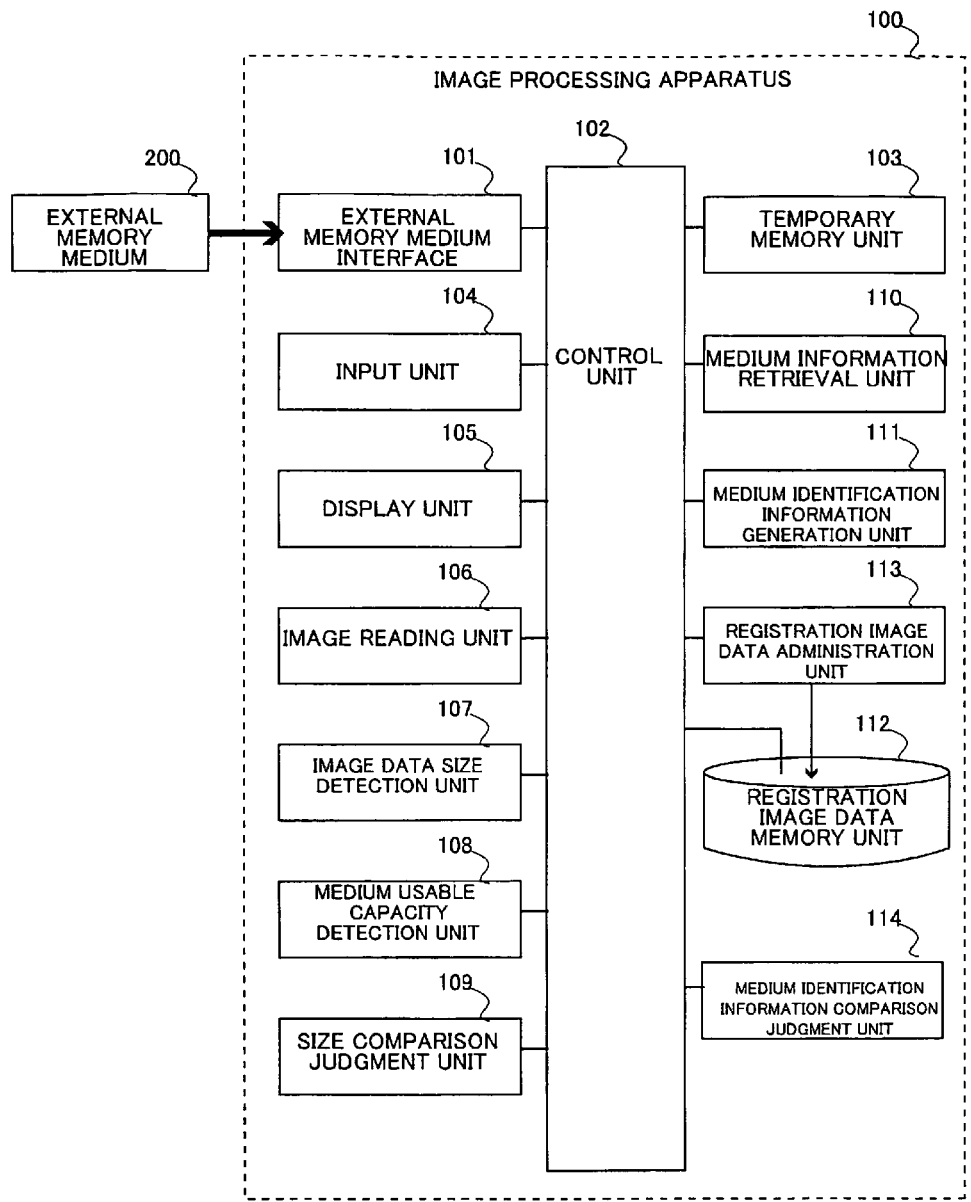
FIG. 1 is a block diagram showing the structure of the image processing apparatus according to the embodiment of the present invention.

The control structure of the image processing apparatus 100 is hereinafter described with reference to FIG. 1 showing a block diagram. As shown in FIG. 1, the image processing apparatus 100 has an external memory medium interface 101 communicating with an external memory medium 200, a control unit 102 controlling the entire apparatus, a temporary memory unit 103, an input unit 104, a display unit 105, an image reading unit 106, an image data size detection unit 107, a medium usable capacity detection unit 108, a size comparison judgment unit 109, a medium information retrieval unit 110, a medium identification information generation unit 111, a registration image data memory unit 12, a registration image data administration unit 113, and a medium identification information verification judgment unit 114.

The image processing apparatus 100 has a communication unit, not shown, communicating information with an information processing terminal such as a PC (Personal Computer) connected locally to the image processing apparatus 100, and generates the image data based on operation performed by the user on the information processing terminal. The image processing apparatus 100 can store the generated image data, depending on an instruction of the user, to either of a memory area in the information processing terminal or the external memory medium 200 inserted into the connector 30, shown in FIG. 2, of the apparatus body. In this description of the embodiment, it is assumed that the user operates the image processing apparatus 100 to generate the image data based on a document and store the generated image data to the external memory medium 200 mounted to the apparatus without operating the image processing terminal.

The external memory medium interface 101 is, for example, an interface such as the connector 30 as shown in FIG. 2 for allowing the external memory medium 200 to detachably connect to the image processing apparatus 100, and has a switch for detecting whether or not the external memory medium 200 is connected. That is, where the external memory medium 200 is inserted into the external memory medium interface 101, the external memory medium interface 101 turns on the switch to generate a switch signal equivalent to 1 (one) and transmit the generated switch signal equivalent to 1 (one) to the control unit 102.

On the other hand, where the external memory medium 200 has finished storing the image data and is disconnected from the external memory medium interface 101, the external memory medium interface 101 turns off the switch to generate the switch signal equivalent to 0 (zero) and transmit the generated switch signal equivalent to 0 (zero) to the control unit 102.

When the user places the document on the platen glass 11, shown in FIG. 2, of the image processing apparatus 100, closes the correction panel 14, and presses an image reading instruction button arranged on the input unit 104, the control unit 102 instructs the image reading unit 106 to read an image.

As shown in FIG. 2, the image reading unit 106 is a reading unit generating the image data by optically reading the document on the platen glass 11. That is, upon receiving the image reading instruction, the image reading unit 106 first rotates the belt roller 16 by driving the stepping motor 15 as shown in FIG. 3. Accordingly, the conveyance belt 13 shown in FIGS. 2 and 3 is driven and starts rotating, and the image reading unit 106 optically reads the document to generate the image data while moving the reading carriage 12 in the subscanning direction.

Once the image reading unit generates the image data, the control unit 102 stores the generated image data to the temporary memory unit 103. Then, when the control unit 102 stores the generated image data to the temporary memory unit 103, the control unit 102 instructs the image data size detection unit 107 to detect the size of the image data where the switch signal equivalent to 1 (one) has been received.

On the other hand, where the control unit 102 has received the switch signal equivalent to 0 (zero), the control unit 102 executes a memory control program, not shown, to display on a display panel of the display unit 105 a medium connection notification instructing the user to connect the external memory medium 200. Then, the control unit 102 deletes the image data memorized in the temporary memory unit 103 unless the user connects the external memory medium 200 to the external memory medium interface 101 within, for example, 15 seconds.

The image data size detection unit 107 is a detection unit having a function to detect the size of the image data. That is, upon receiving the image data size detection instruction, the image data size detection unit 107 detects the size of the image data memorized in the temporary memory unit 103. When the image data size detection unit 107 detects the size of the image data, the control unit 102 stores the size of the image data to the temporary memory unit 103 and instructs the medium usable capacity detection unit 108 to detect the usable capacity in the external memory medium 200.

When the image data size detection unit 107 receives medium identification information and an instruction for detecting the size of registration image data, the image data size detection unit 107 searches the registration image data memory unit 112 for the medium identification information to find the size of the registration image data. When the image data size detection unit 107 detects the size of the registration image data, the control unit 102 stores the size of the registration image data to the temporary memory unit 103, and instructs the medium usable capacity detection unit 108 to detect the usable capacity in the external memory medium 200.

The medium usable capacity detection unit 108 is a detection unit for detecting the usable capacity in a memory area of the external memory medium 200 connected via the external memory medium interface 101. That is, when the medium usable capacity detection unit 108 receives the instruction for detecting the usable capacity in the external memory medium 200, the medium usable capacity detection unit 108 calculates the usable capacity by subtracting the size of the used area in the external memory medium 200 from the total memory size of the external memory medium 200 previously stored in the external memory medium 200.

When the medium usable capacity detection unit 108 detects the usable capacity, the control unit 102 stores the detected usable capacity to the temporary memory unit 103. Then, when the control unit 102 stores the size of the image data and the usable capacity to the temporary memory unit 103, the control unit 102 instructs the size comparison judgment unit 109 to compare the size and the usable capacity to make judgment.

The size comparison judgment unit 109 is a comparison unit for comparing the usable capacity in the external memory medium 200 with the size of the image data or the registration image data to judge whether the image data or the registration image data can be stored to the external memory medium 200. That is, upon receiving the instruction for comparing the size and the usable capacity and making judgment, the size comparison judgment unit 109 compares the usable capacity in the external memory medium 200 with the size of the image data or the registration image data, which are memorized in the temporary memory unit 103, and if the usable capacity in the external memory medium 200 is equal to or more than the size of the image data or the registration image data, the size comparison judgment unit 109 judges that the image data or the registration image data can be stored.

Where the size comparison judgment unit 109 judges that the image data or the registration image data can be stored, the control unit 102 stores the image data to the external memory medium 200 connected to the external memory medium interface 101 where the image data is memorized in the temporary memory unit 103. Then, upon storing the image data to the external memory medium 200, the control unit 102 executes the memory control program, not shown, to display on the display panel arranged on the display unit 105 an image storing completion notification for notifying that the image data has been stored to the external memory medium 200.

On the other hand, the control unit 102 stores the registration image data to the external memory medium 200 where the registration image data is memorized in the registration image data memory unit 112 when the size comparison judgment unit 109 judges that the image data or the registration image data can be stored. Then, when the control unit 102 stores the registration image data to the external memory medium 200, the control unit 102 instructs the registration image data administration unit 113 to delete the registration image data and transmits the medium identification information memorized in the temporary memory unit 103 to the registration image data administration unit 113. When the control unit 102 receives a registration image deletion completion signal in response to the instruction for deleting the registration image data, the control unit 102 executes the memory control program, not shown, to display the image storing completion notification on the display panel arranged on the display unit 105.

When the user sees the image storing completion notification displayed on the display unit 105, the user removes the external memory medium 200 from the external memory medium interface 101 and walks away from the image processing apparatus 100 with the external memory medium 200.

On the other hand, where the usable capacity in the external memory is less than the size of the image data or the registration image data, the size comparison judgment unit 109 judges that the image data or the registration image data cannot be stored.

Where the size comparison judgment unit 109 judges that the image data or the registration image data cannot be stored, the control unit 102 instructs the medium information retrieval unit 110 to obtain medium intrinsic information memorized in the external memory medium 200 where the image data is memorized in the temporary memory unit 103.

Where the registration image data is memorized in the registration image data memory unit 112, the control unit 102 executes the memory control program, not shown, to display on the display panel on the display unit 105 a medium usable capacity shortage notification for notifying the user that the usable capacity in the external memory medium 200 is short.

The medium information retrieval unit 110 is a retrieval unit for obtaining the medium intrinsic information such as device ID, manufacturer ID, and the like stored in each memory area in the external memory medium 200 connected to the external memory medium interface 101 and for obtaining the medium identification information generated as described later. That is, upon receiving the instruction for obtaining the medium intrinsic information, the medium information retrieval unit 110 obtains the medium intrinsic information from an appropriate memory area in the external memory medium 200 based on a specified address previously configured in a memory, not shown.

When the medium information retrieval unit 110 obtains the medium intrinsic information, the control unit 102 stores the obtained medium intrinsic information to the temporary memory unit 103. Then, when the control unit 102 stores the medium intrinsic information to the temporary memory unit 103, the control unit 102 instructs the medium identification information generation unit 111 to generate the medium identification information.

When the medium information retrieval unit 110 receives the instruction for obtaining the medium identification information, described later, the medium information retrieval unit 110 obtains the medium identification information from an appropriate memory area of the external memory medium 200 based on a specified address value previously configured in a memory, not shown. Where the medium identification information is not memorized in the memory area for the medium identification information in the external memory medium 200 due to a reason described later, the medium identification information obtained by the medium information retrieval unit 110 becomes NULL. In this case, the control unit 102 executes the memory control program, not shown, to display on the display panel of the display unit 105 a image non-existence notification notifying that the registration image data memory unit 112 does not memorize the image data that is to be stored to the external memory medium 200 connected to the external memory medium interface 101.

Where the medium information retrieval unit 110 obtains the medium identification information that is not NULL, the control unit 102 stores the medium identification information to the temporary memory unit 103. Then, upon storing the medium identification information to the temporary memory unit 103, the control unit 102 instructs the medium identification information verification judgment unit 114 to verify the medium identification information and make judgment.

The medium identification information generation unit 111 is a generation unit for generating the medium identification information where the external memory medium 200 does not memorize the medium identification information, and has a random number generation function generating arbitrary information, i.e., random data, according to the instruction for generating the medium identification information. That is, upon receiving the instruction for generating the medium identification information, the medium identification information generation unit 111 generates the arbitrary information, and generates the medium identification information by combining the generated arbitrary information with the medium intrinsic information memorized in the temporary memory unit 103.

When the medium identification information generation unit 111 generates the medium identification information, the control unit 102 instructs the registration image data administration unit 113 to register the registration image data, and transmits the medium identification information and the image data memorized in the temporary memory unit 103 to the registration image data administration unit 113.

The registration image data memory unit 112 is a memory unit for memorizing the registration image data including the image data and the medium identification information associated with the image data according to the instruction from the registration image data administration unit 113 where the image data obtained by the image reading unit 106 cannot be stored in the external memory medium 200 due to the shortage of the usable capacity in the external memory medium 200 connected to the external memory medium interface 101. It should be noted that the registration image data memory unit 112 is, for example, a volatile memory unit made up with DRAM (Dynamic Random Access Memory) divided into memory areas in a prescribed size electrically memorizing data, and loses all memorized data when a power switch, not shown, of the image processing apparatus 100 is turned off to cut off electricity supply. In the present embodiment, the registration image data memory unit 112 is the volatile memory unit, but the invention is not limited thereto. The registration image data memory unit 112 may be a non-volatile memory such as flash memory, HD (Hard Disk), and the like.

The registration image data administration unit 113 is an administration unit administering the registration image data memorized in the registration image data memory unit 112. That is, when the registration image data administration unit 113 receives the instruction for registering the image data together with the image data and the medium identification information, the registration image data administration unit 113 generates the registration image data by associating the image data with the medium identification information, and newly registers the registration image data to the registration image data memory unit 112. When the registration image data administration unit 113 newly registers the image data, the registration image data administration unit 113 generates an image registration completion signal, and transmits the image registration completion signal to the control unit 102.

When the control unit 102 receives the image registration completion signal, the control unit 102 stores the medium identification information memorized in the temporary memory unit 103 to an appropriate memory area in the external memory medium 200 connected to the external memory medium interface 101 based on a specified address value previously configured in a memory, not shown. Then, the control unit 102 executes the memory control program, not shown, to display on the display panel of the display unit 105 the medium usable capacity shortage notification for notifying the user that the usable capacity in the external memory medium 200 is short.

When the registration image data administration unit 113 receives an instruction for deleting the registration image data, described later, together with the medium identification information, the registration image data administration unit 113 deletes the image data corresponding to the medium identification information from the administration image data memory unit 112. Then, when the registration image data administration unit 113 deletes the registration image data, the registration image data administration unit 113 generates the registration image deletion completion signal, and transmits the registration image deletion completion signal to the control unit 102.

When the user sees the medium usable capacity shortage notification displayed on the display unit 105 of the image processing apparatus 100, the user removes the external memory medium 200 from the external memory medium interface 101, walks toward, for example, the information processing terminal owned by the user, and operates the information processing terminal to transfer data stored in the used area of the external memory medium 200 to a memory area in the information processing terminal so that the usable capacity in the external memory medium 200 increases.

When the user finishes operation for increasing the usable capacity in the external memory medium 200 and inserts the external memory medium 200 into the connector 30, shown in FIG. 2, representing the external memory medium interface 101 of the image processing apparatus 100, the control unit 102 judges as to whether the image reading button on the input unit 104 is pressed down within, for example, 15 seconds after the external memory medium 200 is connected to the external memory medium interface 101. Where the image reading button is not pressed down within such time limit, the control unit 102 judges that the user wants to obtain the registration image data memorized in the registration image data memory unit 112, and instructs the medium information retrieval unit 110 to obtain the medium identification information memorized in the external memory medium 200.

The medium identification information verification judgment unit 114 searches the registration image data memory unit 112 for the medium identification information obtained from the external memory medium 200, and is a judgment unit for judging as to whether the registration image data corresponding to the medium identification information is memorized in the registration image data memory unit 112. That is, when the medium identification information verification judgment unit 114 receives the instruction for verifying the medium identification information and making judgment, the medium identification information verification judgment unit 114 judges as to whether the medium identification information exits in the registration image data memory unit 112 that agrees with the obtained medium identification information, and where there exists the medium identification information agreeing with the obtained medium identification information, the medium identification information verification judgment unit 114 judges that the agreeing medium identification information is found. Upon receiving this judgment, the control unit 102 instructs the image data size detection unit 107 to detect the size of the registration image data, and transmits the medium identification information memorized in the temporary memory unit 103 to the image data size detection unit 107.

On the other hand, where the medium identification information verification judgment unit 114 judges that the agreeing medium identification information is not found because the medium identification information agreeing with the obtained medium identification information does not exist in the registration image data memory unit 112, the control unit 102 executes the memory control program, not shown, to display on the display panel of the display unit 105 the image non-existence notification notifying that the registration image data memory unit 112 does not memorize the image data that is to be stored to the external memory medium 200.

Operation of the image processing apparatus 100 according to the present embodiment of the present invention is hereinafter described. It is assumed that the image processing apparatus 100 is a scanner.

Figure 4:
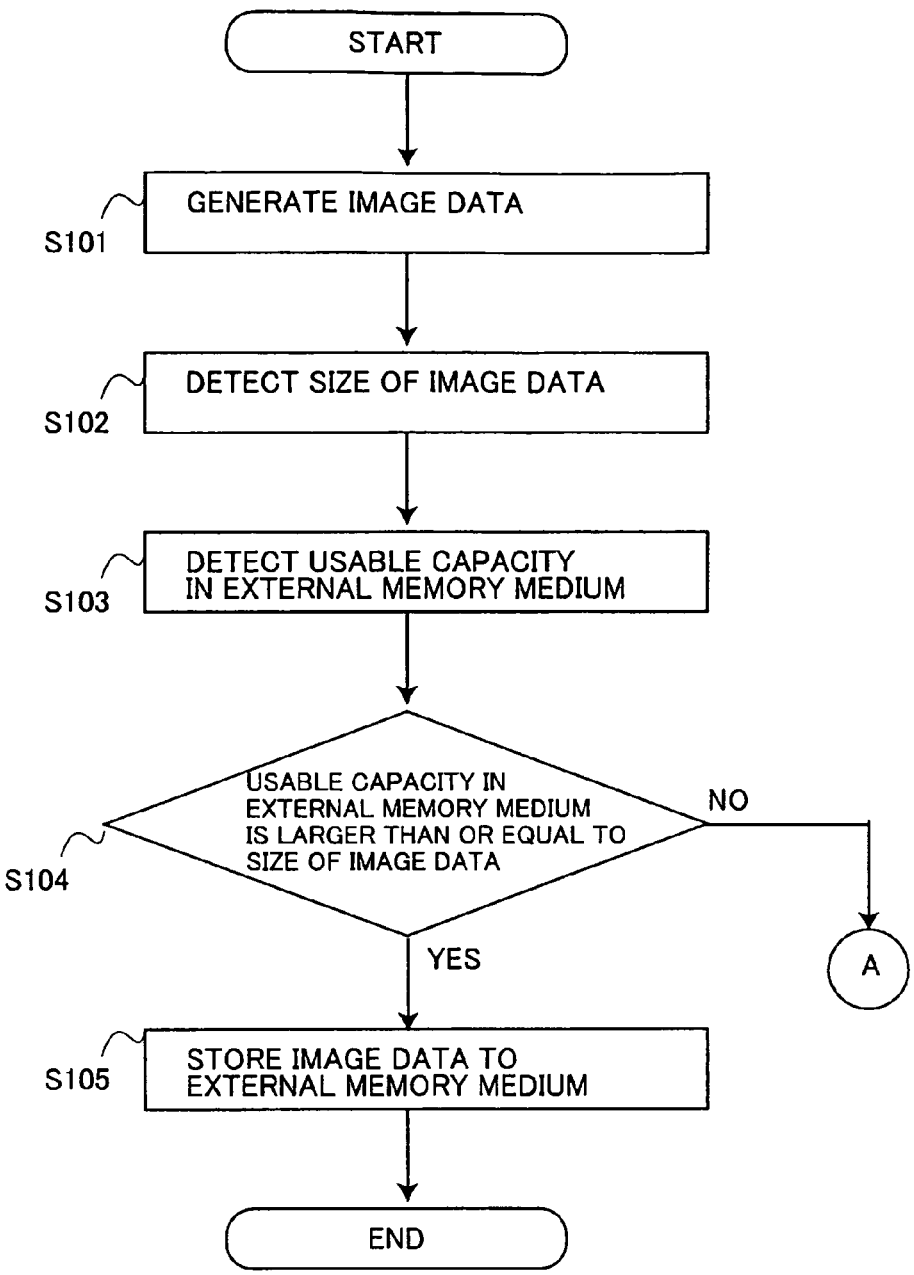

First, operation of the image processing apparatus 100 when generating the image data is hereinafter described with reference to the flowcharts in FIGS. 4 and 5.

The control unit 102 of the image processing apparatus 100, i.e., the scanner, executes the memory control program, not shown, to notify on the display panel on the display unit 105 a job waiting notification notifying the user that the apparatus is waiting for a job.

The user places a document on the platen glass 11 shown in FIG. 2, closes the correction panel 14, and presses down the image reading instruction button on the input unit 104. Thereafter, the control unit 102 instructs the image reading unit 106 to read an image.

As shown in FIG. 2, the image reading unit 106 is a reading unit for generating image data by optically reading the document on the platen glass 11. That is, upon receiving the instruction for reading the image, the image reading unit 106 first drives the stepping motor 15, as shown in FIG. 3, to rotate the belt roller 16. Thereby, the conveyance belt 13 shown in FIGS. 2 and 3 is driven and starts rotating, and the image reading unit 106 optically reads the document to generate the image data while moving the reading carriage 12 in the sub-scanning direction (Step S101).

When the image reading unit 106 generates the image data, the control unit 102 memorizes the generated image data in the temporary memory unit 103. When the control unit 102 stores the image data in the temporary memory unit 103, the control unit 102 instructs the image data size detection unit 107 to detect the size of the image data where the switch signal equivalent to 1 (one) has been received.

On the other hand, where the control unit 102 has received the switch signal equivalent to 0 (zero), the control unit 102 executes the memory control program, not shown, to display on the display panel of the display unit 105 the medium connection instruction instructing the user to connect the external memory medium 200. Then, the control unit 102 deletes the image data memorized in the temporary memory unit 103 unless the user connects the external memory medium 200 to the external memory medium interface 101 within, for example, 15 seconds.

When the image data size detection unit 107 receives the image data size detection instruction, the image data size detection unit 107 detects the size of the image data memorized in the temporary memory unit 103. (Step S102) When the image data size detection unit 107 detects the size of the image data, the control unit 102 stores the size of the image data to the temporary memory unit 103 and instructs the medium usable capacity detection unit 108 to detect the usable capacity in the external memory medium 200.

When the medium usable capacity detection unit 108 receives the instruction for detecting the usable capacity in the external memory medium 200, the medium usable capacity detection unit 108 calculates the usable capacity by subtracting the size of the used area in the external memory medium 200 from the total memory size of the external memory medium 200 previously stored in the external memory medium 200.

When the medium usable capacity detection unit 108 detects the usable capacity (Step S103), the control unit 102 stores the detected usable capacity to the temporary memory unit 103. Then, when the control unit 102 memorizes the size of the image data and the usable capacity in the external memory medium 200, the control unit 102 instructs the size comparison judgment unit 109 to compare the size and the usable capacity to make judgment.

When the size comparison judgment unit 109 receives the instruction for comparing the size and the usable capacity and making judgment, the size comparison judgment unit 109 compares the usable capacity in the external memory medium 200 with the size of the image data, which are memorized in the temporary memory unit 103, and if the usable capacity in the external memory medium 200 is equal to or more than the size of the image data (Step S104), the size comparison judgment unit 109 judges that the image data can be stored.

Where the size comparison judgment unit 109 judges that the image data can be stored, the control unit 102 stores the image data to the external memory medium 200 connected to the external memory medium interface 101 where the image data is memorized in the temporary memory unit 103 (Step S104). Then, upon storing the image data to the external memory medium 200, the control unit 102 executes the memory control program, not shown, to display on the display panel arranged on the display unit 105 the image storing completion notification notifying that the image data has been stored to the external memory medium 200.

When the user sees the image storing completion notification displayed on the display unit 105, the user removes the external memory medium 200 from the external memory medium interface 101 and walks away from the image processing apparatus 100 with the external memory medium 200.

On the other hand, where the usable capacity in the external memory is less than the size of the image data, the size comparison judgment unit 109 judges that the image data cannot be stored.

Where the size comparison judgment unit 109 judges that the image data cannot be stored, the control unit 102 instructs the medium information retrieval unit 110 to obtain the medium intrinsic information memorized in the external memory medium 200 because the image data is memorized in the temporary memory unit 103.

When the medium information retrieval unit 110 receives the instruction for obtaining the medium intrinsic information, the medium information retrieval unit 110 obtains the medium intrinsic information from the appropriate memory area in the external memory medium 200 based on the specified address previously configured in the memory, not shown (Step S106).

When the medium information retrieval unit 110 obtains the medium intrinsic information, the control unit 102 stores the obtained medium intrinsic information to the temporary memory unit 103. Then, when the control unit 102 stores the medium intrinsic information to the temporary memory unit 103, the control unit 102 instructs the medium identification information generation unit 111 to generate the medium identification information.

When the medium identification information generation unit 111 receives the instruction for generating the medium identification information, the medium identification information generation unit 111 generates the arbitrary information, i.e., the random data, and generates the medium identification information by combining the generated arbitrary information with the medium intrinsic information memorized in the temporary memory unit 103 (Step S107).

When the medium identification information generation unit 111 generates the medium identification information, the control unit 102 instructs the registration image data administration unit 113 to register the registration image data, and transmits the medium identification information and the image data memorized in the temporary memory unit 103 to the registration image data administration unit 113.

When the registration image data administration unit 113 receives the instruction for registering the image data together with the image data and the medium identification information, the registration image data administration unit 113 generates the registration image data by associating the image data with the medium identification information, and newly registers the registration image data to the registration image data memory unit 112 (Step S108). When the registration image data administration unit 113 newly registers the image data, the registration image data administration unit 113 generates the image registration completion signal, and transmits the image registration completion signal to the control unit 102.

When the control unit 102 receives the image registration completion signal, the control unit 102 stores the medium identification information memorized in the temporary memory unit 103 to the appropriate memory area in the external memory medium 200 connected to the external memory medium interface 101 based on the specified address value previously configured in the memory, not shown (Sep S109). Then, upon storing the medium identification information to the external memory medium 200, the control unit 102 executes the memory control program, not shown, to display on the display panel of the display unit 105 the medium usable capacity shortage notification for notifying the user that the usable capacity in the external memory medium 200 is short (Step S110).

When the user sees the medium usable capacity shortage notification displayed on the display unit 105 of the image processing apparatus 100, the user removes the external memory medium 200 from the external memory medium interface 101, walks toward, for example, the information processing terminal owned by the user, and operates the information processing terminal to transfer data stored in the used area of the external memory medium 200 to the memory area in the information processing terminal so that the usable capacity in the external memory medium 200 increases.

Hereinafter described with reference to the flowchart in FIG. 6 is operation of storing the registration image data memorized in the registration image data memory unit 112 of the image processing apparatus 100 to the external memory medium 200 connected to the external memory medium interface 101.

When the user finishes operation for increasing the usable capacity in the external memory medium 200 and inserts the external memory medium 200 into the connector 30, shown in FIG. 2, representing the external memory medium interface 101 of the image processing apparatus 100, the control unit 102 judges as to whether the image reading button on the input unit 104 is pressed down within, for example, 15 seconds after the external memory medium 200 is connected to the external memory medium interface 101. Where the image reading button is not pressed down within such time limit, the control unit 102 judges that the user wants to obtain the registration image data memorized in the registration image data memory unit 112, and instructs the medium information retrieval unit 110 to obtain the medium identification information memorized in the external memory medium 200.

When the medium information retrieval unit 110 receives the instruction for obtaining the medium intrinsic information, the medium information retrieval unit 110 obtains the medium intrinsic information from the appropriate memory area in the external memory medium 200 based on the specified address previously configured in the memory, not shown (Step S111). When the medium information retrieval unit 110 receives the medium identification information that is NULL (Step S112), the control unit 102 executes the memory control program, not shown, to display on the display panel of the display unit 105 the image non-existence notification notifying that the registration image data memory unit 112 does not memorize the image data that is to be stored to the external memory medium 200 connected to the external memory medium interface 101 (Step S113).

Where the medium information retrieval unit 110 obtains the medium identification information that is not NULL, the control unit 102 stores the medium identification information to the temporary memory unit 103. Then, upon storing the medium identification information to the temporary memory unit 103, the control unit 102 instructs the medium identification information verification judgment unit 114 to verify the medium identification information and make judgment.

When the medium identification information verification judgment unit 114 receives the instruction for verifying the medium identification information and making judgment, the medium identification information verification judgment unit 114 judges as to whether the medium identification information exits in the registration image data memory unit 112 that agrees with the obtained medium identification information (Step S114), and where there exists the medium identification information agreeing with the obtained medium identification information (Step S115), the medium identification information verification judgment unit 114 judges that the agreeing medium identification information is found. Upon receiving this judgment, the control unit 102 instructs the image data size detection unit 107 to detect the size of the registration image data, and transmits the medium identification information memorized in the temporary memory unit 103 to image data size detection unit 107.

On the other hand, where the medium identification information verification judgment unit 114 judges that the agreeing medium identification information is not found because the medium identification information agreeing with the obtained medium identification information does not exist in the registration image data memory unit 112, the control unit 102 executes the memory control program, not shown, to display on the display panel of the display unit 105 the image non-existence notification notifying that the registration image data memory unit 112 does not memorize the image data that is to be stored to the external memory medium 200 (Step S113).

When the image data size detection unit 107 receives medium identification information and the instruction for detecting the size of the registration image data, the image data size detection unit 107 searches the registration image data memory unit 112 for the medium identification information to find the size of the registration image data (Step S116). When the image data size detection unit 107 detects the size of the registration image data, the control unit 102 stores the size of the registration image data to the temporary memory unit 103, and instructs the medium usable capacity detection unit 108 to detect the usable capacity in the external memory medium 200.

The medium usable capacity detection unit 108 receives the instruction for detecting the usable capacity in the external memory medium 200, the medium usable capacity detection unit 108 calculates the usable capacity by subtracting the size of the used area in the external memory medium 200 from the total memory size of the external memory medium 200 (Step S117).

When the medium usable capacity detection unit 108 detects the usable capacity, the control unit 102 stores the detected usable capacity to the temporary memory unit 103. Then, when the control unit 102 stores the size of the image data and the usable capacity to the temporary memory unit 103, the control unit 102 instructs the size comparison judgment unit 109 to compare the size and the usable capacity to make judgment.

When the size comparison judgment unit 109 receives the instruction for comparing the size and the usable capacity and making judgment, the size comparison judgment unit 109 compares the usable capacity in the external memory medium 200 with the size of the registration image data, which are memorized in the temporary memory unit 103, and if the usable capacity in the external memory medium 200 is equal to or more than the size of the registration image data (Step S118), the size comparison judgment unit 109 judges that the registration image data can be stored.

On the other hand, where the usable capacity in the external memory is less than the size of the registration image data, the size comparison judgment unit 109 judges that the registration image data cannot be stored.

Where the size comparison judgment unit 109 judges that the registration image data cannot be stored, the control unit 102 executes the memory control program, not shown, to display on the display panel of the display unit 105 the medium usable capacity shortage notification for notifying the user that the usable capacity in the external memory medium 200 is short because the registration image data memory unit 112 memorizes the registration image data (Step S119).

When the user sees the medium usable capacity shortage notification displayed on the display unit 105 of the image processing apparatus 100, the user removes the external memory medium 200 from the external memory medium interface 101, walks toward, for example, the information processing terminal owned by the user, and operates the information processing terminal to transfer data stored in the used area of the external memory medium 200 to the memory area in the information processing terminal so that the usable capacity in the external memory medium 200 increases.

Where the size comparison judgment unit 109 judges that the registration image data can be stored, the control unit 102 stores the registration image data to the external memory medium 200 because the registration image data is memorized in the registration image data memory unit 112 (Step S120). Then, when the control unit 102 stores the registration image data to the external memory medium 200, the control unit 102 instructs the registration image data administration unit 113 to delete the registration image data and transmit the medium identification information memorized in the temporary memory unit 103 to the registration image data administration unit 113.

When the registration image data administration unit 113 receives the instruction for deleting the registration image data together with the medium identification information, the registration image data administration unit 113 deletes the image data corresponding to the medium identification information from the registration image data memory unit 112 (Step S121). Then, when the registration image data administration unit 113 deletes the registration image data, the registration image data administration unit 113 generates the registration image deletion completion signal, and transmits the registration image deletion completion signal to the control unit 102.

When the control unit 102 receives the registration image deletion completion signal, the control unit 102 executes the memory control program, not shown, to display the image storing completion notification on the display panel arranged on the display unit 105.

When the user sees the image storing completion notification displayed on the display unit 105, the user removes the external memory medium 200 from the external memory medium interface 101 and walks away from the image processing apparatus 100 with the external memory medium 200.

Where the size of the image data generated by the image reading unit 106 is more than the usable capacity in the external memory medium 200 connected to the external memory medium interface 101, the image processing apparatus 100 of the present embodiment generates the medium identification information based on the medium intrinsic information obtained from the external memory medium 200, stores to the registration image data memory unit 112 the registration image data including the image data and the medium identification information associated with the image data, and stores the medium identification information to the external memory medium 200. Thus, when the user removes the external memory medium 200 from the apparatus body, performs operation to increase the usable capacity in the external memory medium 200, and inserts the external memory medium 200 into the apparatus body, the image processing apparatus 100 searches the registration image data memory unit 112 for the registration image data having the medium identification information corresponding to the medium identification information memorized in the external memory medium 200, and stores to the external memory medium 200 the registration image data having the corresponding medium identification information. Therefore, the image processing apparatus 100 can store the registration image data memorized in the registration image data memory unit 112 to only the external memory medium 200 that was attached to the apparatus body during the image generation processing of the registration image data, thus capable of preventing the image data from being leaked to a malicious third person.

In the present embodiment, the image processing apparatus 100 compares the size of the generated image data with the usable capacity in the external memory medium 200, and where the size of the image data is less than or equal to the usable capacity, the image processing apparatus 100 stores the image data to the external memory medium 200. However, to give consideration to a case where the external memory medium 200 having a small total memory capacity is used, the image processing apparatus 100 may also be structured to have an image data dividing unit 115 dividing the image data based on the usable capacity where the size of the image data is more than the usable capacity in the external memory medium 200. An image processing apparatus 100a structured as described above has a divided image data memory unit 116 memorizing divided image data generated by the image data dividing unit 115 and a divided image data administration unit 117 administering the divided image data held by the divided image data memory unit 116 in place of the registration image data memory unit 112 and the registration image data administration unit 113 held by the image processing apparatus 100.

In the image processing apparatus 100a structured as described above, the image data dividing unit 115 generates the divided image data, and attaches, to each of the divided image data, header information showing dividing sequence and a data flag showing whether the divided image data is the final divided image data (in a case of the final divided image data, the data flag is 1, and in other cases, the data flag is 0). When the image data dividing unit 115 generates the divided image data, the divided image data administration unit 117 stores, based on an instruction from a control unit 102a, the divided image data having the header information and the data flag attached thereto to the divided image data memory unit 116.

Then, when the external memory medium 200 capable of storing the divided image data is attached to the apparatus body after generation of the divided image data, the control unit 102a in the image processing apparatus 100a stores the divided image data to the external memory medium 200 in the sequence of dividing based on the header information and the data flag. Herein, when the control unit 102a stores the divided image data to the external memory medium 200, the control unit 102a instructs the divided image data administration unit 117 to delete the corresponding divided image data held by the divided image data memory unit 116. Thus, the divided image data administration unit 117 deletes from the divided image data memory unit 116 the divided image data that has been stored to the external memory medium 200, so that the control unit 102a stores the divided image data to the external memory medium 200 in the sequence of dividing based on the header information and the data flag.

It should be assumed that in the structure as described above, the image processing terminal obtaining the divided image data generated by the image processing apparatus 100a via the external memory medium 200 has a function to generate original image data upon judging, based on the header information and the data flag attached to each of the divided image data, the sequence of combining the divided image data, combining all of the divided image data when obtaining all of the divided image data, and deleting each of the header information and the data flag.

In the present embodiment, an example is described where the image processing apparatus 100 and the image processing apparatus 100a are scanners, but the present invention is not limited thereto and can be applied to each apparatus having a function to generate image data such as a printer, an MFP (Multifunction Peripheral), a digital camera, and the like.

Thus, although it is assumed that data stored to the external memory medium 200 is the image data of a document read by the image processing apparatus 100 and the image processing apparatus 100a, namely, a scanner, the data stored to the external memory medium 200 should not necessarily be the image data made up with only the image data of the document.

Further, the medium identification information generation unit 111 of the image processing apparatus 100 and the image processing apparatus 100a of the present embodiment may also be structured to encrypt the generated medium identification information to give consideration to security.

When the external memory medium 200 is inserted into the external memory medium interface 101, the image processing apparatus 100 and the image processing apparatus 100a of the present embodiment store the corresponding registration image data held by the registration image data memory unit 112 to the external memory medium 200 based on whether the medium identification information obtained from the external memory medium 200 agrees with the medium identification information held by the registration image data memory unit 112. However, it may also be structured that, for example, all of the external memory medium owned by a company previously memorize the medium identification information showing that the external memory medium is a company's property, and that the image data is stored to the external memory medium 200 when it is recognized that the registration image data memory unit 112 memorizes the image data and the external memory medium owned by the company is attached to the apparatus body even though it is not the external memory medium 200 that was attached to the apparatus body during the generation of the image data.

In the embodiment as described above, a scanner is described as an example of the image processing apparatus of the embodiment of the present invention, but the present invention can also be applied to all apparatuses having a function to generate image data such as a printer, an MFP (Multi Function Products), a digital camera, and the like.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image processing apparatus comprising:
an interface unit configured to detachably connect to an external memory medium, the external memory medium storing medium identification information for identifying the external memory medium;
an image size detection unit configured to detect a size of image data that is to be stored to the external memory medium;
a usable capacity detection unit configured to detect a usable capacity in the external memory medium connected to the interface unit;
a size comparison judgment unit configured to compare the size of the image data with the usable capacity in the external memory medium, and judge as to whether or not the size of the image data is larger than the usable capacity in the external memory medium;

a medium identification information reading unit configured to read out the medium identification information from the external memory medium; and a registration image data memory unit configured to, in a case where the size comparison judgment unit judges that the size of the image data is larger than the usable capacity in the external memory medium, associate the judged image data with the medium identification information, and store the judged image data as registration image data, wherein in a case where the external memory medium is reconnected with the interface unit, the medium identification information reading unit reads the medium identification information from the external memory medium, and wherein in a case where the size comparison judgment unit judges that the size of the registration image data is smaller than the usable capacity of the external memory medium, the registration image data, which are stored in the registration image data memory unit in association with the medium identification information read out by the medium identification information reading unit, are written to the external memory medium reconnected with the interface.

2. The image processing apparatus according to claim 1 further comprising:
an image data dividing unit for dividing, based on the usable capacity, the image data into a plurality of divided image data, when the size of the image data is larger than the usable capacity in the external memory medium.

3. The image processing apparatus according to claim 2 further comprising:
a divided-image data memory unit for storing divided-image data, when the size of the image data is larger than the usable capacity in the external memory medium.

4. The image processing apparatus according to claim 3, wherein at least one of the plurality of the divided image data generated by the image dividing unit is written to the external memory medium.

5. The image processing apparatus according to claim 2, wherein at least one of the plurality of divided image data generated by the image dividing unit is written to the external memory medium.

6. The image processing apparatus according to claim 2, wherein the image dividing unit generates the divided image data attached with header information showing a dividing sequence and attached with flag information showing as to whether the divided image data are last divided image data in the dividing sequence.

7. The image processing apparatus according to claim 1, wherein the medium identification information generation unit generates the medium identification information based on at least one of a device ID and a manufacturer ID previously stored in the external memory medium.

8. The image processing apparatus according to claim 1, further comprising:
an image dividing unit configured to divide, based on the usable capacity, the image data into a plurality of divided image data, when the size of the image data is larger than the usable capacity in the external memory medium,
wherein at least one of the plurality of divided image data generated by the image dividing unit is written to the external memory medium.

9. The image processing apparatus according to claim 8, wherein the image dividing unit generates the divided image data attached with header information showing a dividing sequence and attached with flag information showing as to whether the divided image data are last divided image data in the dividing sequence.

10. The image processing apparatus according to claim 1, wherein the medium identification information is generated based on a combination of arbitrary information and intrinsic information.

11. The image processing apparatus according to claim 1, further comprising a temporary memory unit configured to store the image data generated at the image reading unit,
wherein the control unit deletes the image data stored in the temporary memory unit unless the user connects the external memory medium to the external memory medium interface within a prescribed time period.

12. The image processing apparatus according to claim 1, further comprising:
an image reading button configured to start image reading at the image reading unit;
a registration image data memory unit configured to store registration image data corresponding with the image data obtained at the image reading unit;
a medium information retrieval unit configured to obtain medium identification information stored in the external memory medium; and
a control unit configured to judge that the user wants to obtain the registration image data stored in the registration image data memory unit, and instruct the medium information retrieval unit to obtain the medium identification information stored in the external memory medium in a case where the image reading button is not pressed down within the predetermined time period after the external memory medium is connected to the interface unit.

* * * * *